(12) United States Patent
Faust

(10) Patent No.: US 7,498,801 B2
(45) Date of Patent: *Mar. 3, 2009

(54) APPARATUS, METHOD, AND COMPUTER PROGRAM PRODUCT FOR MONITORING AND CONTROLLING A MICROCOMPUTER USING A SINGLE EXISTING PIN

(75) Inventor: Robert Allan Faust, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/029,913

(22) Filed: Feb. 12, 2008

(65) Prior Publication Data

US 2008/0211487 A1   Sep. 4, 2008

Related U.S. Application Data

(63) Continuation of application No. 10/821,044, filed on Apr. 8, 2004, now Pat. No. 7,355,384.

(51) Int. Cl.
*G01R 31/00* (2006.01)

(52) U.S. Cl. .................................... 324/158.1
(58) Field of Classification Search ........................ None
See application file for complete search history.

(56) References Cited

U.S. PATENT DOCUMENTS

| | | | |
|---|---|---|---|
| 4,987,319 A * | 1/1991 | Kawana | 326/37 |
| 5,570,035 A | 10/1996 | Dukes et al. | |
| 5,663,970 A | 9/1997 | Bae | |
| 5,815,493 A * | 9/1998 | Riley | 370/242 |
| 5,959,489 A * | 9/1999 | Walck | 327/333 |
| 6,191,626 B1 | 2/2001 | Prysby et al. | |
| 6,294,949 B1 | 9/2001 | Kojima et al. | |
| 6,320,805 B1 | 11/2001 | Yamaoka et al. | |
| 6,631,486 B1 | 10/2003 | Komatsu et al. | |
| 6,651,203 B1 | 11/2003 | Frankowsky | |
| 6,977,634 B2 | 12/2005 | Kim et al. | |
| 7,113,541 B1 | 9/2006 | Lys et al. | |
| 2002/0167336 A1 | 11/2002 | Jamieson et al. | |
| 2004/0187049 A1 | 9/2004 | West | |
| 2006/0294444 A1 | 12/2006 | You et al. | |

* cited by examiner

*Primary Examiner*—Vinh P Nguyen
(74) *Attorney, Agent, or Firm*—Duke W. Yee; Diana Roberts-Gerhardt; Theodore D. Fay, III

(57) ABSTRACT

A method, apparatus, and computer program product are disclosed for monitoring and controlling a device using only one input/output (I/O) communication pin of the device. The pin is configured to be used to both transmit and receive data. Logical ones are generated using pulses that are a first length and logical zeros are generated using pulses that are a second length. The device is communicated with utilizing the generated logical ones and generated logical zeros by transmitting the logical ones and zeros to the device, and receiving the logical ones and zeros from the device utilizing the single I/O pin.

9 Claims, 5 Drawing Sheets

APPARATUS, METHOD, AND COMPUTER PROGRAM PRODUCT FOR MONITORING AND CONTROLLING A MICROCOMPUTER USING A SINGLE EXISTING PIN

This application is a continuation of application Ser. No. 10/821,044, filed Apr. 8, 2004, now U.S. Pat. No. 7,355,384.

BACKGROUND OF THE INVENTION

1. Technical Field

The present invention relates to data processing systems, and more particularly to an electronic processing device that has multiple input/output pins for communicating with the device. Still more specifically, the present invention relates to a method, apparatus, and product for monitoring and controlling an electronic processing device using only a single existing pin of the device.

2. Description of Related Art

A microprocessor or microcontroller is an electronic processing device that includes multiple input/output pins for communicating with the device. These pins are used to input and output data to and from the device.

After applications are developed and embedded in microcontrollers, they frequently do not include any means to monitor their behavior and internal status. This is largely due to the scarcity of resources in the microcontroller's package which provides the input/output pins for the microcontroller. A two-pin serial port could be used for this, but there are drawbacks to this approach. Using a serial port would require the dedication of two of the input/output communication pins of the device, the hardware that drives the port may not be available, and a external test device that has serial port capabilities would be required in order to monitor the microcontroller.

Therefore, a need exists for a method, apparatus, and product for monitoring and controlling a device using only a single existing pin of the device.

SUMMARY OF THE INVENTION

A method, apparatus, and computer program product are disclosed for monitoring and controlling a device using only one input/output (I/O) communication pin of the device. The pin is configured to be used to both transmit and receive data. Logical ones are generated using pulses that are a first length and logical zeros are generated using pulses that are a second length. The device is communicated with utilizing the generated logical ones and generated logical zeros by transmitting the logical ones and zeros to the device, and receiving the logical ones and zeros from the device utilizing the single I/O pin.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
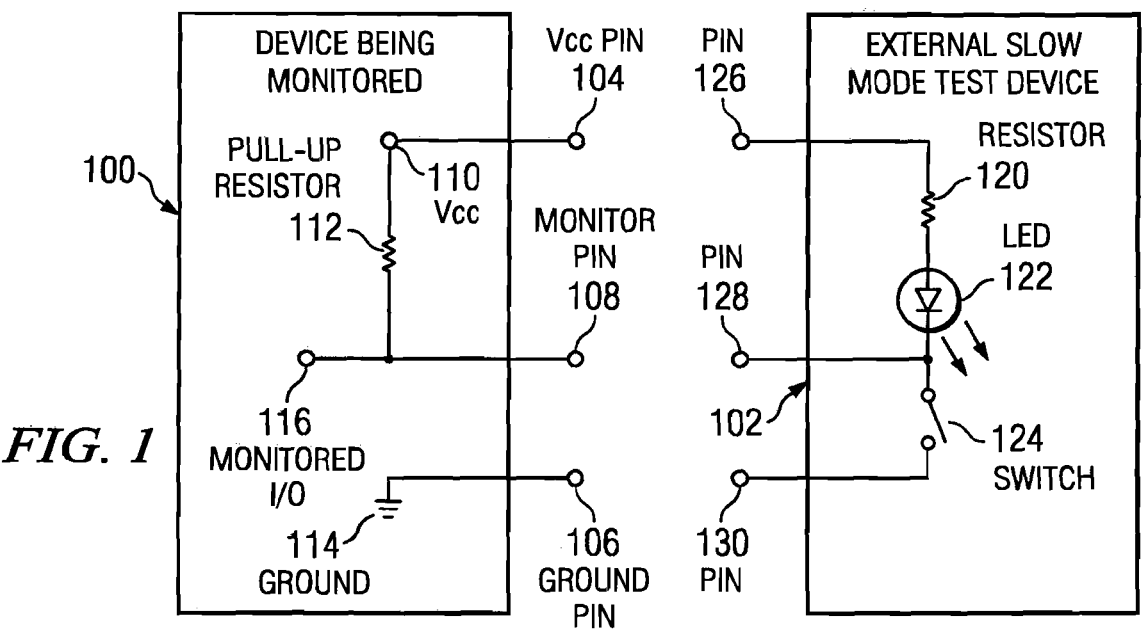
FIG. 1 is a block diagram that depicts a device under test and an external test device that uses a first mode, such as a slow mode, to communicate with the device in accordance with the present invention.

A preferred embodiment of the present invention and its advantages are better understood by referring to the figures, like numerals being used for like and corresponding parts of the accompanying figures.

The phrase "device under test" is used herein as a naming convention in order to distinguish the device from an external device. The present invention can be used to test devices or simply to monitor or merely access devices. The phrase "under test" does not limit the present invention to merely devices that are being tested.

The present invention is a method, apparatus, and computer program product for monitoring and controlling a device, such as a device under test, that is implemented within an integrated circuit package using only a single existing pin of the device's package. This single I/O pin, referred to herein as the monitor pin, can be made to function as the device's interface to an external test device. In this manner, the device under test can provide selectable outputs that span a range from very simple to complex. An output could be as simple as lighting a light or as complex as reporting the contents of an array of bytes.

The monitor pin is configured to be used to both receive and transmit data. The pin is configured as an open collector output with a pull-up resistor connected between the monitor pin and power. The monitor pin can serve as both an input pin and an output pin. The device under test is commanded using the monitor pin with one or more low-going, short or long pulses on the monitor pin.

As described in more detail below, the present invention provides for two different modes for communicating with the device under test. When in the first mode, according to the preferred embodiment, the external test device includes a switch that grounds the pin that can be used to create such a short or long pulse. The external test device also provides an LED that is used to receive and display the output from the device under test. Communications between the device and the external test device are typically at a slower rate. This mode is referred to below as the "slow mode".

The second mode is referred to below as a "fast mode". In the fast mode, the external test device includes an electronic circuit that is connected to the monitor pin and that is capable of issuing and receiving pulses at a high speed, much like a single pin duplex serial port. According to the preferred embodiment illustrated below, the electronic circuit is a bi-directional driver that can both transmit and receive data.

In addition to the monitoring function described above, commands can be developed that when input into the device under test via the single monitor pin will change the behavior of the device.

A "pulse" as used herein means a signal that has dropped from Vcc, such as 5 Volts, to ground and after the desired pulse duration, returns to Vcc. However, any number of other data formats could be used for input and output. Further, the commands described below are merely one example of commands that may be developed in order to monitor and/or control the device under test. Other types of pulses could be used instead of those described in order to perform the associated functions.

The present invention provides for resetting the device under test to the slow mode and default output using a reset command. Although the reset command is preferably a very long pulse, any other type of pulse that is designated as a reset pulse can be used.

The choice of the minimum pulse length depends on the device and the frequency of calls to the device and/or whether the monitor pin has an interrupt capability.

The following describes a preferred embodiment for inputting commands in the slow mode in the form of binary values. Logical ones are long pulses, and logical zeros are short pulses. The pulse length can vary as long as a difference between long pulses and short pulses can be distinguished. Further, the length of the long pulse should not be as long as the reset pulse in order to distinguish logical ones from reset commands. No value may be all zeros or all ones as this would make pulse length ambiguous. And, the number of required pulses depends on how many commands the device is designed to understand. This will vary from case to case. For example, four pulses will provide 14 different commands excluding 0000 and 1111.

The following describes a preferred embodiment for outputting commands in the slow mode in the form of binary values. The slow mode consists of pulses that will light an external LED, included in the external test device, that is connected back to the device's Vcc through a limiting resistor. Long and short pulses represent ones and zeros. For most systems, the preferred logical one pulse is on for 0.5 seconds and then off for 0.5 seconds and the preferred logical zero pulse is on for 0.1 seconds and off for 0.5 seconds although these values may be adjusted to optimize the system. In this manner, eight pulses will convey eight bits.

The following describes a preferred embodiment for inputting and outputting commands in the fast mode in the form of binary values. The fast mode requires a serial port-like electronic circuit to be connected to the monitor pin. The fast mode allows commands to be sent to and received from the device under test much more rapidly than the slow mode. The maximum data rate depends upon the capability of the microcontroller and whether the monitor pin has interrupt capability. If the pin cannot interrupt, a long start pulse must be applied so that the monitor function which is called repeatedly will have time to see that a start pulse is present. In addition, the signal must rise to Vcc before the first bit can be sent. Either a return-to-zero or non-return-to-zero bit format may be used.

One of the commands will place the device in fast mode. Another command may be used to return the device to slow mode although the reset pulse will also do this.

The following are examples of commands that may be used to communicate with the device under test. These commands may be used in either the fast or slow mode.

| COMMAND | OUTPUT |
| --- | --- |
| Test | Blink for a few seconds then return to the previous output state. |
| Output a particular value | Value is output indicating the particular value |
| Output a particular state | Value is output indicating the particular state |
| Output current state | Value is output indicating the current state |
| Output whether a particular state has been entered | Either a one or zero is output indicating whether particular state has been entered |
| Indicate whether a particular state has ever been entered | Either a one or zero is output indicating whether the particular state was ever entered |
| Output maximum stack depth | Value is output |
| Output current version | Value is output |
| Change value of variable to particular value | Output particular value after value of variable is changed |
| Go to fast mode | Output a value indicating change to fast mode |

FIG. 1 is a block diagram that depicts a device under test 100 and an external test device 102 that uses a first mode, such as a slow mode, to communicate with device 100 in accordance with the present invention. Power to device 100 consists of Vcc and ground. These voltages are made available to the external test device 102 via pins 104 and 106 respectively. Device 100 can communicate with other devices via input/output communication pins. According to the present invention, only one pin, pin 108, is necessary in order to monitor, access, and/or control device 100.

Vcc pin 104 is coupled to Vcc power 110 within device 100. A pull-up resistor 112 is coupled between Vcc power 110 and monitored I/O 116. Ground pin 106 is coupled to Ground 114 within device 100.

An external test device 102 includes a limiting resistor 120, an LED 122, and a switch 124. Resistor 120 is coupled between pin 126 and LED 122. Pin 128 provides a connection between LED 122 and switch 124. Pin 130 provides a connection to the node of switch 124.

In order to monitor, access, and/or control device 100, external test device 102 may be attached by connecting pin 104 to pin 126, connecting pin 108 to pin 128, and connecting pin 106 to pin 130.

When switch 124 is closed, pin 106 is pulled to ground. When switch 124 is then opened, pin 106 is pulled back to Vcc. By opening and closing switch 124, pulses may be generated and input to device 100. The length of time switch 124 remains opened and closed determines the length of the pulse, and, thus, whether the pulses indicate logical ones or logical zeros.

Similarly, device 100 can output data using LED 122 which will flash as the voltage level of pin 108 changes from ground to Vcc.

Figure 2:
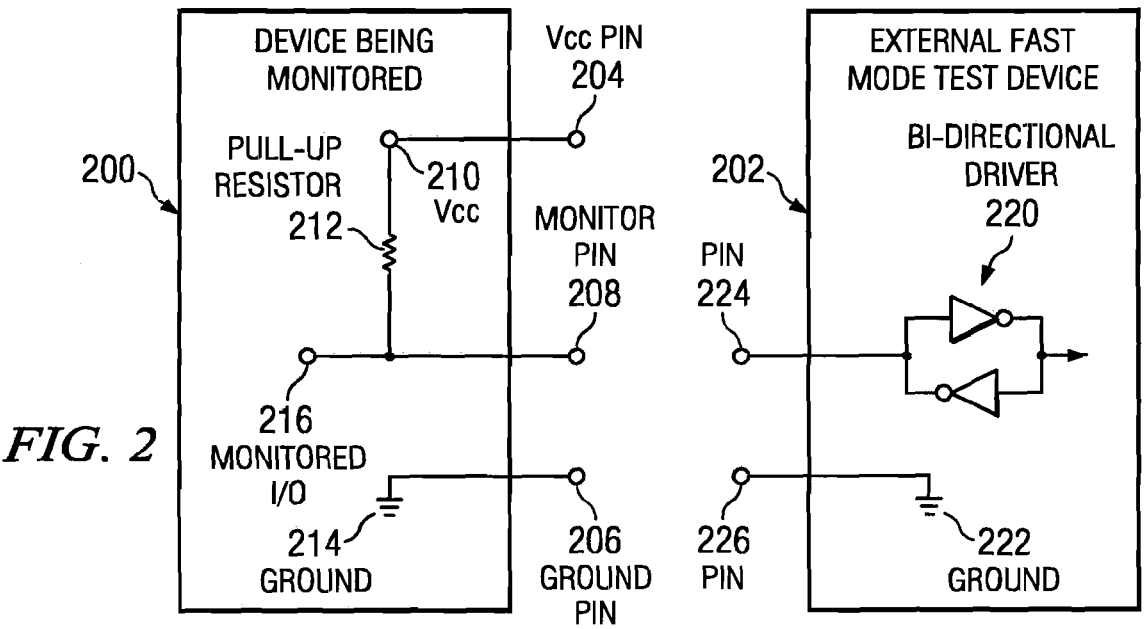
FIG. 2 is a block diagram that illustrates a device under test and an external test device that uses a second mode, such as a fast mode, to communicate with the device in accordance with the present invention.

FIG. 2 is a block diagram that illustrates a device under test 200 and an external test device 202 that uses a second mode, such as a fast mode, to communicate with the device 200 in accordance with the present invention.

Device 202 is powered by the circuitry (not shown) that is sending and receiving signals through device 202. As such, Vcc pin 204 will not be used in this case. Ground pin 206 is still used, however. Device 200 can communicate with other devices via input/output communication pins. According to the present invention, only one pin, pin 208, is necessary in order to monitor and/or control device 200.

Vcc pin 204 is coupled to Vcc power 210 within device 200. A pull-up resistor 212 is coupled between Vcc power 210 and monitored I/O 216. Ground pin 206 is coupled to Ground 214 within device 200.

External test device 202 includes a bi-directional driver 220 and Ground 222. Device 202 includes I/O pin 224 and Ground pin 226. Pin 224 is connected to one node of a bi-directional driver 220. The other node of bi-directional driver 220 is provided to the rest of device 202 which is not shown.

External test device 202 may be connected to device 200 in order to monitor, access, and/or control device 200 by connecting pin 208 to pin 224 and connecting pin 206 to pin 226.

Figure 3:
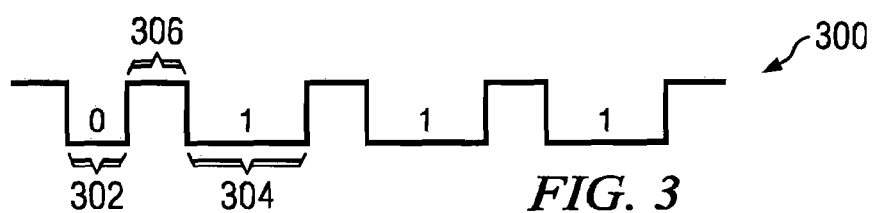
FIG. 3 depicts a bit stream where the length of each pulse indicates whether the pulse represents a logical one or logical zero bit in accordance with the present invention.

FIG. 3 depicts a bit stream 300 where the length of each pulse indicates whether the pulse represents a logical one or logical zero bit in accordance with the present invention. Bit stream 300 illustrates a binary bit stream of bits 0111. The length, or width, of each pulse is used to determine whether a pulse indicates a logical one or zero. Bit stream 300 may be input manually into the device under test using the slow mode, or may be input using the fast mode by external test device 202. Further, the value 0111, for example, may be used to indicate to the device under test that the device should begin communicating using the fast mode.

Once in fast mode, the preferred signaling method is a standard RS232 method with the exception that transmitting and receiving both occur on the same pin. A reset signal may be used to return the device under test to the slow mode.

Figure 4:
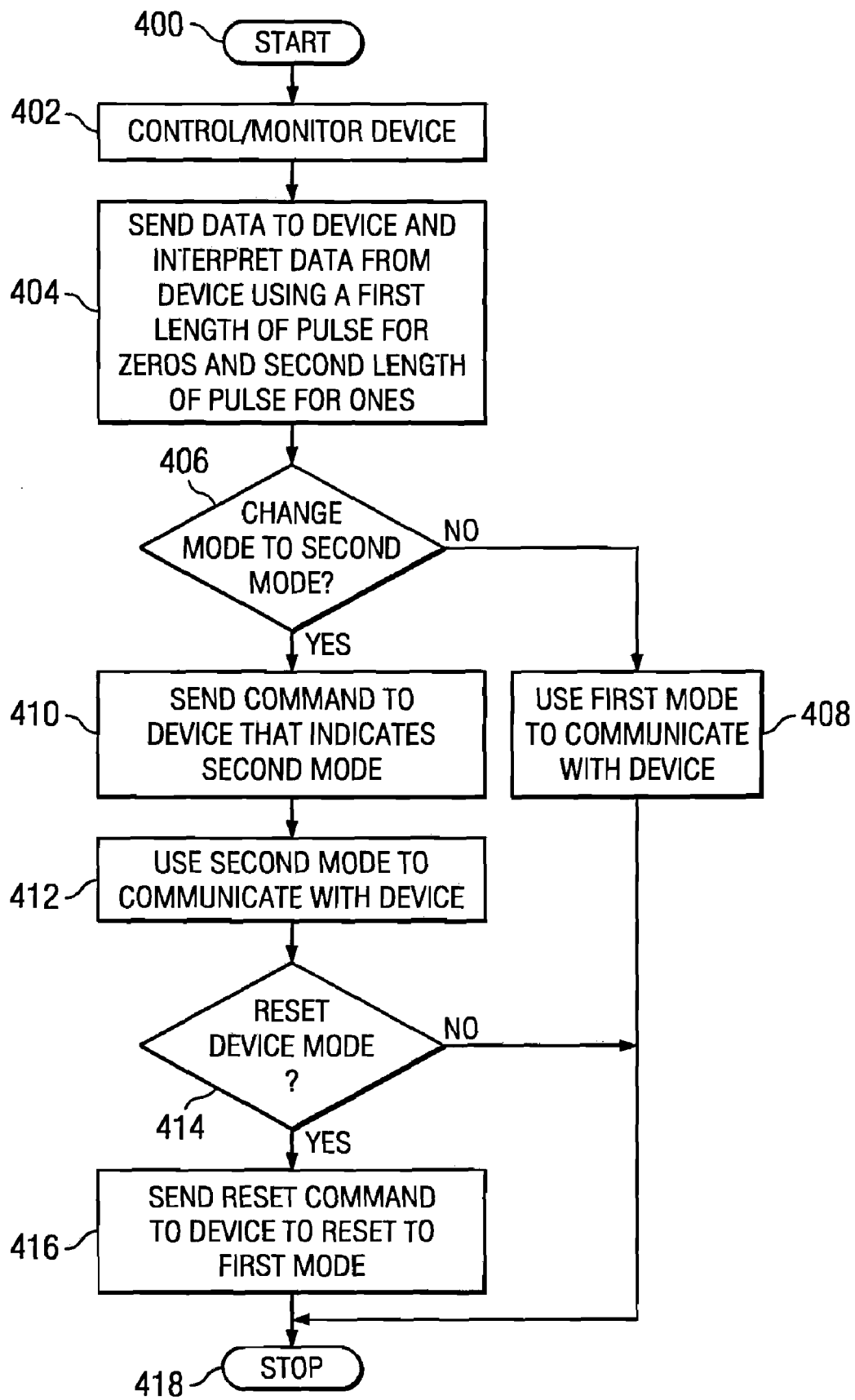
FIG. 4 illustrates a high level flow chart which depicts monitoring and/or controlling a device under test using only a single existing input/output pin of the device in accordance with the present invention.

FIG. 4 illustrates a high level flow chart which depicts monitoring and/or controlling a device under test using only a single existing input/output pin of the device in accordance with the present invention. The process starts as depicted by block 400 and thereafter passes to block 402 which illustrates controlling and/or monitoring a device under test. The device under test may be a microcontroller, microcomputer, or other device implemented within a package that provides input/output pins for communicating with the device.

Next, block 404 depicts sending data to the device and interpreting data received from the device using a first length of pulse to indicate a logical zero and a second length of pulse to indicate a logical one. Thereafter, block 406 illustrates a determination of whether or not the mode used to communicate with the device should be changed from a first mode to a second mode. If a determination is made that the mode should not be changed from a first mode to a second mode, the process passes to block 408 which depicts using the first mode to communicate with the device. The process then passes to block 418.

Referring again to block 406, if a determination is made that the mode should be changed from a first mode to a second mode, the process passes to block 410 which depicts sending a command to the device that indicates that the second mode should be used. Block 412, then, illustrates using the second mode to communicate with the device.

The process then passes to block 414 which illustrates a determination of whether or not to reset the mode being used to communicate with the device. If a determination is made that the mode should not be reset, the process passes to block 418. Referring again to block 414, if a determination is made that the mode should be reset, the process passes to block 416 which depicts sending a reset command to the device which then resets its communication mode to the first mode. The process then terminates as illustrated by block 418.

Figure 5A:
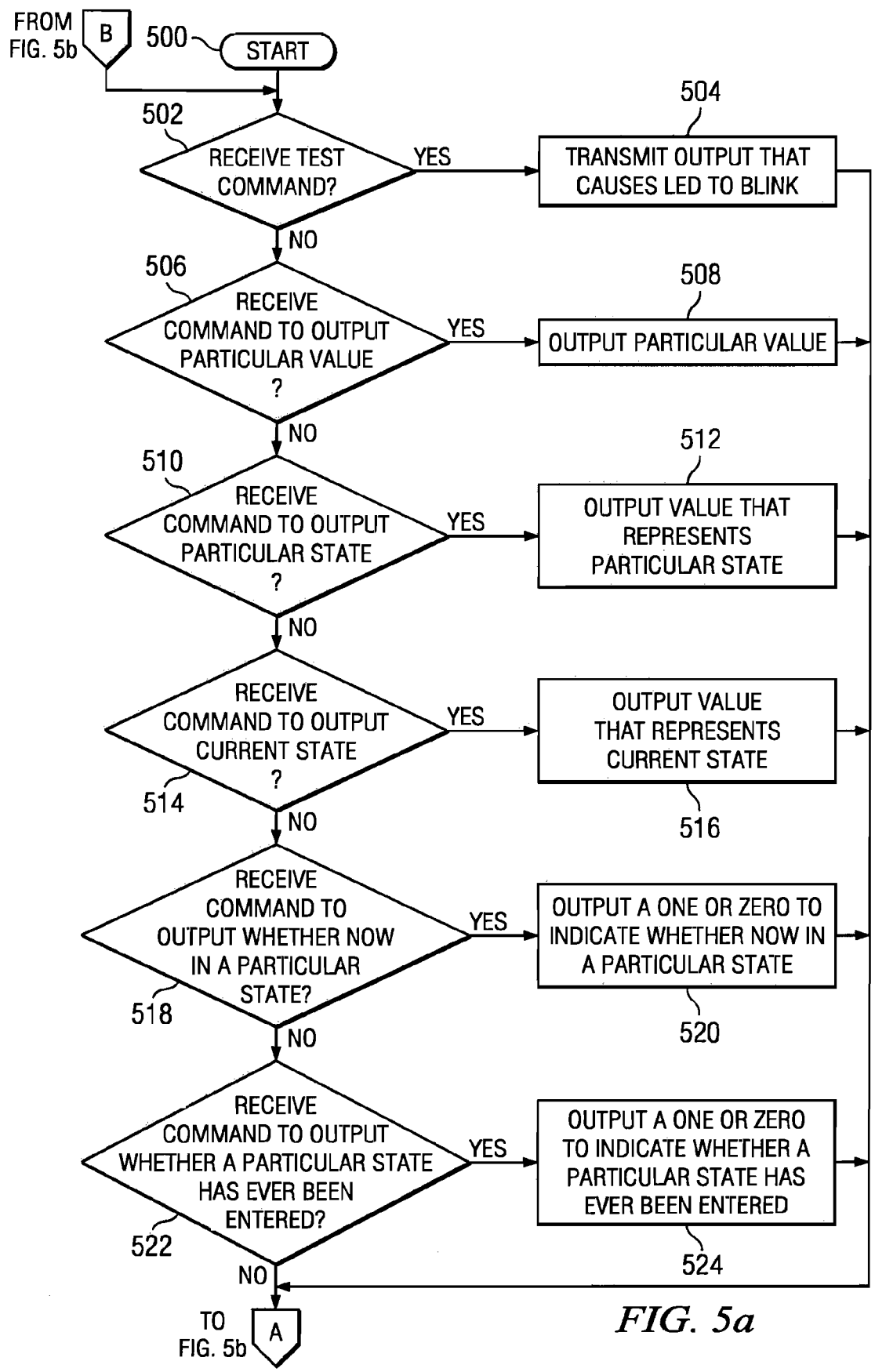
FIGS. 5a and 5b together depict a high level flow chart which illustrates a device under test receiving and then responding to a command using a single existing input/output pin of the device in accordance with the present invention.
Figure 5B:
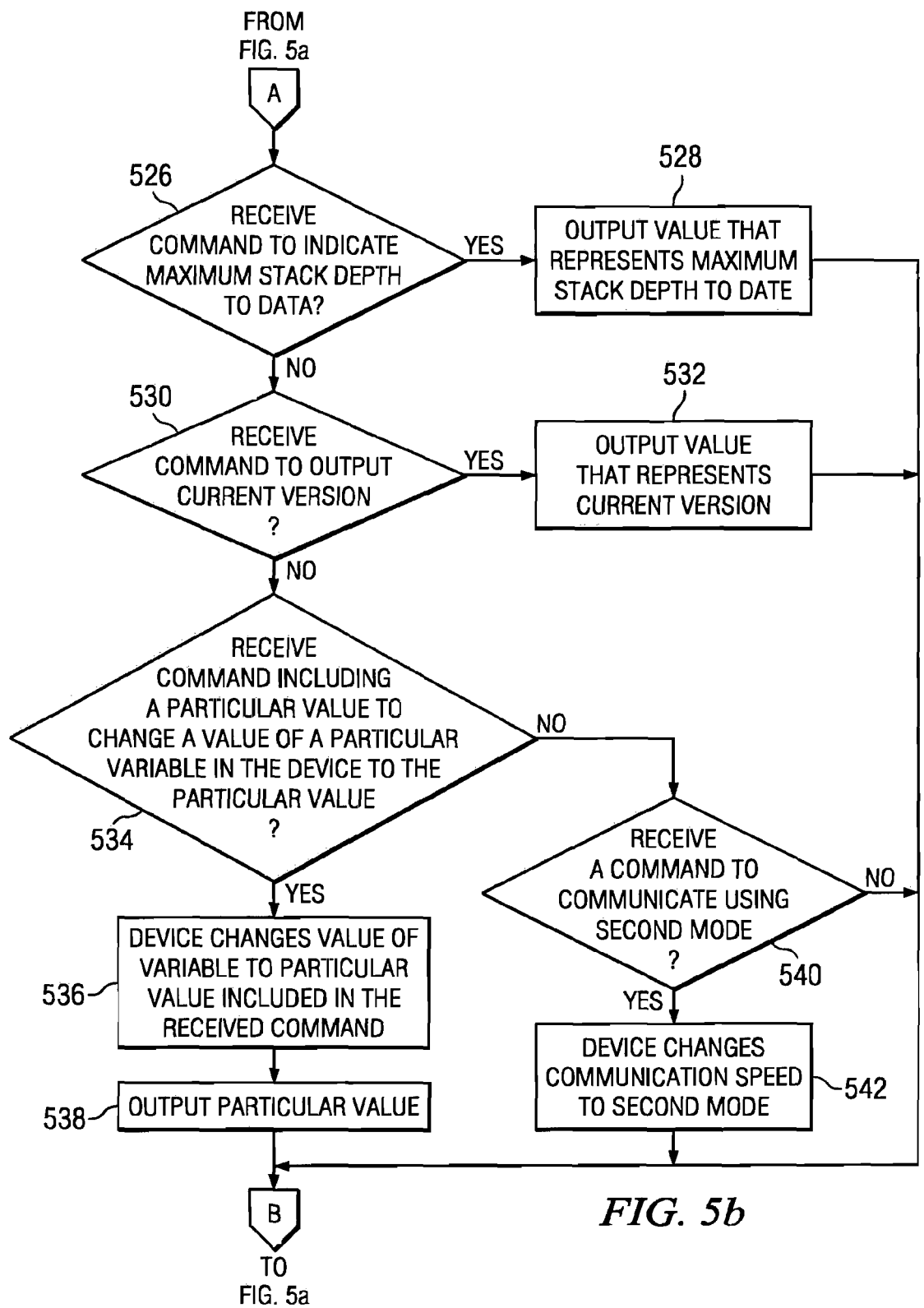

FIGS. 5a and 5b together depict a high level flow chart which illustrates a device under test receiving and then responding to a command using a single existing input/output pin of the device in accordance with the present invention. The process starts as depicted by block 500 and thereafter passes to block 502 which illustrates a determination of whether or not the device has received a test command. If a determination is made that the device has received a test command, the process passes to block 504 which depicts the device transmitting an output that causes the LED, included in the test device, to blink. The process then passes back to block 502.

Referring again to block 502, if a determination is made that the device has not received a test command, the process passes to block 506 which illustrates a determination of whether or not the device has received a command to output a particular value. If a determination is made that the device has received a command to output a particular value, the process passes to block 508 which depicts the device transmitting an output that represents the particular value. The process then passes to block 502.

Referring again to block 506, if a determination is made that the device has not received a command to output a particular value, the process passes to block 510 which illustrates a determination of whether or not the device has received a command to output a particular state. If a determination is made that the device has received a command to output a particular state, the process passes to block 512 which depicts the device transmitting an output that represents the particular state. The process then passes to block 502.

Referring again to block 510, if a determination is made that the device has not received a command to output a particular state, the process passes to block 514 which illustrates a determination of whether or not the device has received a command to output the current state. If a determination is made that the device has received a command to output the current state, the process passes to block 516 which depicts the device transmitting an output that represents the current state. The process then passes to block 502.

Referring again to block 514, if a determination is made that the device has not received a command to output the current state, the process passes to block 518 which illustrates a determination of whether or not the device has received a command to output whether the device is now in a particular state. If a determination is made that the device has received a command to output an indication of whether the device is now in a particular state, the process passes to block 520 which depicts the device transmitting either a logical one or zero depending on whether the device is now in a particular state. The process then passes to block 502.

Referring again to block 518, if a determination is made that the device has not received a command to output an indication of whether the device is now in a particular state, the process passes to block 522 which depicts a determination of whether or not the device has received a command to output an indication of whether or not the device has ever entered a particular state. If a determination is made that the device has received a command to output an indication of whether or not the device has ever entered a particular state, the process passes to block 524 which depicts the device transmitting an output that is either a logical one or zero and that indicates whether or not the device has ever entered the particular state. The process then passes to block 502.

Referring again to block 522, if a determination is made that the device has not received a command to output an indication of whether or not the device has ever entered a particular state, the process passes to block 526 which depicts a determination of whether or not the device has received a command to output an indication of the device's maximum stack depth to date. If a determination is made that the device has received a command to output an indication of the device's maximum stack depth to date, the process passes to block 528 which depicts the device transmitting an output that indicates the device's maximum stack depth to date. The process then passes to block 502.

Referring again to block 526, if a determination is made that the device has not received a command to output an indication of the device's maximum stack depth to date, the process passes to block 530 which depicts a determination of whether or not the device has received a command to output an indication of the device's current version. If a determination is made that the device has received a command to output an indication of the device's current version, the process passes to block 532 which depicts the device transmitting an output that indicates the device's current version. The process then passes to block 502.

Referring again to block 530, if a determination is made that the device has not received a command to output an indication of the device's current version, the process passes to block 534 which depicts a determination of whether or not the device has received a command to change the value of one of its variables. If a determination is made that the device has received a command to change the value of one of its variables, the process passes to block 536 which depicts the device changing the value of one of its variables to the particular value that was included in the received command. The process then passes to block 538 which illustrates the device transmitting an output that indicates the particular variable. The process then passes to block 502.

Referring again to block 534, if a determination is made that the device has not received a command to change the value of one of its variables, the process passes to block 540 which illustrates a determination of whether or not the device has received a command to change its communication mode. If a determination is made that the device has received a command to change its communication mode, the process passes to block 542 which depicts the device changing the speed of its communication to the second mode. The process then passes to block 502.

Referring again to block 540, if a determination is made that the device has not received a command to change its communication mode, the process passes to block 502.

Figure 6:
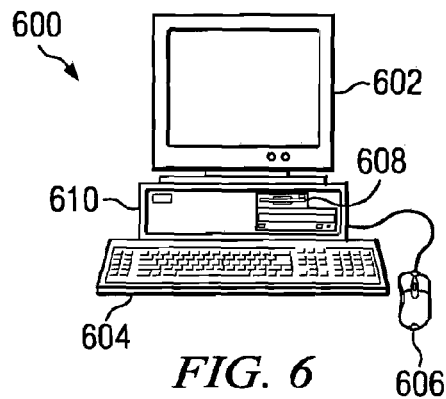
FIG. 6 illustrates a data processing system that includes the present invention in accordance with the present invention.

FIG. 6 illustrates a data processing system that includes the present invention in accordance with the present invention. A computer 600 is depicted which includes a system unit 610, a video display terminal 602, a keyboard 604, storage devices 608, which may include floppy drives, hard disk drive, tape drives, and other types of permanent and removable storage media, and mouse 606. Additional input devices may be included with personal computer 600, such as, for example, a joystick, touchpad, touch screen, trackball, microphone, and the like. Computer 600 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 600 also preferably includes a graphical user interface that may be implemented by means of systems software residing in computer readable media in operation within computer 600.

Figure 7:
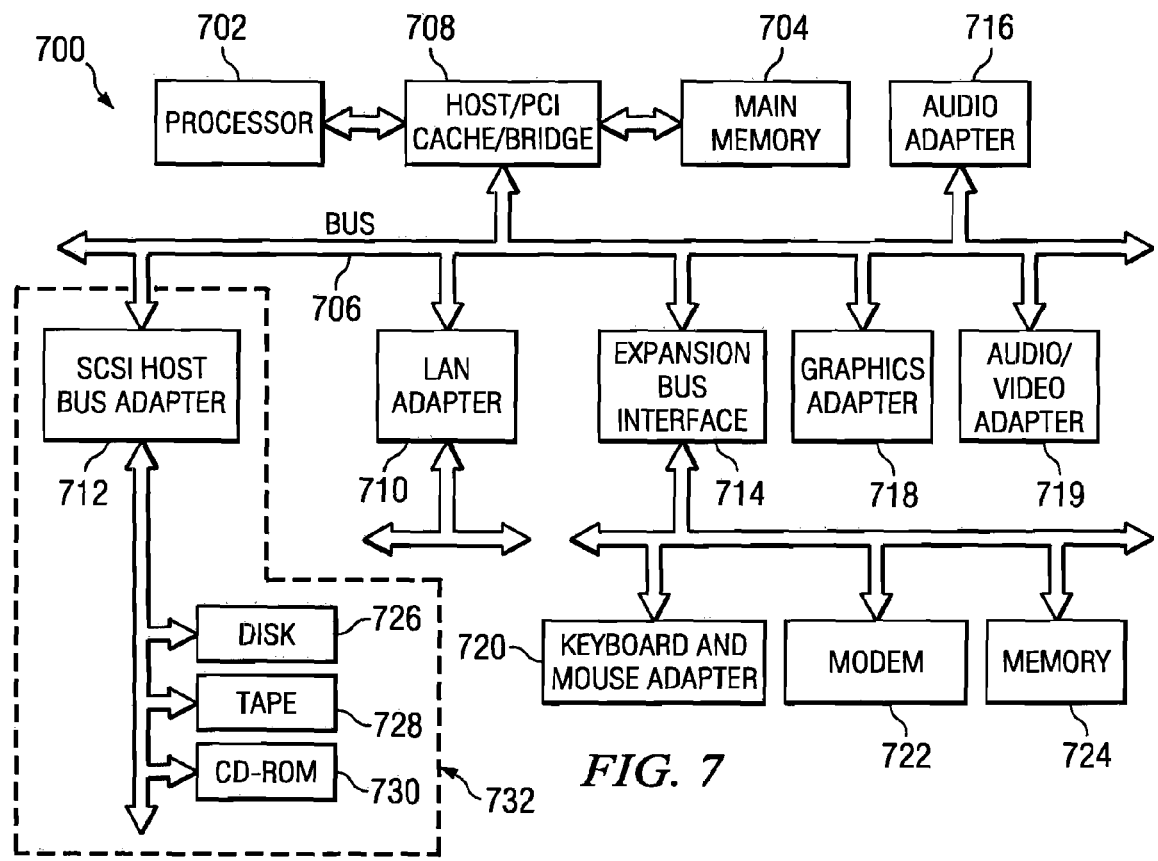
FIG. 7 depicts a more detailed block diagram of a data processing system that includes the present invention in accordance with the present invention.

FIG. 7 depicts a more detailed block diagram of a data processing system that includes the present invention in accordance with the present invention. Data processing system 700 is an example of a computer, such as computer 600 in FIG. 6, in which code or instructions implementing the processes of the present invention may be located.

Processor 702 and main memory 704 are connected to PCI local bus 706 through PCI bridge 708. PCI bridge 708 also may include an integrated memory controller and cache memory for processor 702. Additional connections to PCI local bus 706 may be made through direct component interconnection or through add-in boards. In the depicted example, local area network (LAN) adapter 710, small computer system interface SCSI host bus adapter 712, and expansion bus interface 714 are connected to local bus 706 by direct component connection. In contrast, audio adapter 716, graphics adapter 718, and audio/video adapter 719 are connected to local bus 706 by add-in boards inserted into expansion slots. Expansion bus interface 714 provides a connection for a keyboard and mouse adapter 720, modem 722, and additional memory 724. SCSI host bus adapter 712 provides a connection for hard disk drive 726, tape drive 728, and CD-ROM drive 730.

An operating system runs on processor 702 and is used to coordinate and provide control of various components within data processing system 700 in FIG. 7. The operating system may be a commercially available operating system such as Windows 2000, which is available from Microsoft Corporation. An object oriented programming system such as Java may run in conjunction with the operating system and provides calls to the operating system from Java programs or applications executing on data processing system 700. "Java" is a trademark of Sun Microsystems, Inc. Instructions for the operating system, the object-oriented programming system, and applications or programs are located on storage devices, such as hard disk drive 726, and may be loaded into main memory 704 for execution by processor 702.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the processes of the present invention may be applied to a multiprocessor data processing system.

The processes of the present invention are performed by processor 702 using computer implemented instructions, which may be located in a memory such as, for example, main memory 704, memory 724, or in one or more peripheral devices 726-730.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for monitoring and controlling a device using only one input/output (I/O) communication pin of the device, the system comprising:

the I/O communication pin being configured to both transmit and receive pulses, the pulses comprising first pulses that represent logical ones and second pulses that represent logical zeros, the first pulses having a first width and the second pulses having a second width;

the I/O communication pin for transmitting and receiving the first and second pulses to communicate with the device;

the I/O communication pin being configured by connecting the I/O communication pin to a first node of a pull-up resistor and connecting a second node of the pull-up resistor to a power source; and the I/O communication pin being configured as an open collector output that will serve as both an input pin and an output pin.

2. The system according to claim 1, further comprising:

the first and second pulses being generated using an external device that is coupled to the device using the I/O communication pin.

3. The system according to claim 2, further comprising:

a first node of a second resistor included within the external device connected to a power source;

a second node of the second resistor connected to a first node of an LED;

a second node of the LED connected to a first communication pin of the external device;

the second node of the LED connected to a first node of a switch; and a second node of the switch connected to ground.

4. The system according to claim 3, further comprising:

the first communication pin of the external device connected to the I/O communication pin of the device; and the first and second pulses being generated by opening and closing the switch.

5. The system according to claim 4, further comprising:

a bit stream generated by repeatedly opening and closing the switch to generate the first and second pulses;

the first pulses generated by closing the switch for a first length of time; and the second pulses generated by closing the switch for a second length of time.

6. The system according to claim 4, further comprising:

the first communication pin of the external device connected to the I/O communication pin of the device; and the first communication pin of the external device for receiving the first and second pulses transmitted by device utilizing the I/O communication pin; and the LED for outputting the first and second pulses.

7. The system according to claim 2, further comprising:

a first node of a bi-directional driver that is included in the external device connected to a first communication pin of the external device; and the first communication pin connected to the I/O communication pin of the device.

8. The system according to claim 7, further comprising:

the first and second pulses generated by the external device and outputting the first and second pulses using the first communication pin.

9. A computer program product for monitoring and controlling a device using only one input/output (I/O) communication pin of the device, the product comprising:

instructions for configuring the I/O communication pin to be used to transmit and receive pulses, the pulses comprising first pulses that represent logical ones and second pulses that represent logical zeros, the first pulses having a first width and the second pulses having a second width;

instructions for communicating with the device by transmitting and receiving the first and second pulses via the I/O communication pin;

instructions for generating a bit stream by repeatedly opening and closing a switch that is external to the device and connected to the I/O communication pin to generate the first and second pulses;

instructions for generating the first pulses by closing the switch for a first length of time; and instructions for generating the second pulses by closing the switch for a second length of time.

* * * * *